(12) United States Patent
Moore

(10) Patent No.: US 8,070,375 B2
(45) Date of Patent: Dec. 6, 2011

(54) COUPLING AND SHAFT ASSEMBLY

(75) Inventor: Kenneth P. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 947 days.

(21) Appl. No.: 11/232,195

(22) Filed: Sep. 21, 2005

(65) Prior Publication Data
US 2007/0065225 A1    Mar. 22, 2007

(51) Int. Cl.
*F16D 1/00* (2006.01)
(52) U.S. Cl. ............ 403/13; 403/290; 403/373; 403/383
(58) Field of Classification Search ............ 403/13, 403/14, 289, 290, 344, 373, 344.3, 383; 74/DIG. 10, 74/450
See application file for complete search history.

(56) References Cited

U.S. PATENT DOCUMENTS

| | | | | |
|---|---|---|---|---|
| 2,230,902 A * | 2/1941 | Overbey | | 74/448 |
| 3,042,433 A * | 7/1962 | Koen | | 403/19 |
| 3,186,247 A * | 6/1965 | Burrell | | 74/447 |
| 3,760,605 A * | 9/1973 | Schroder | | 403/358 |
| 4,848,951 A * | 7/1989 | Boogerman et al. | | 403/344 |
| 4,892,430 A * | 1/1990 | Liska et al. | | 403/24 |
| 5,052,842 A * | 10/1991 | Janatka | | 403/14 |
| 5,054,269 A * | 10/1991 | Leino | | 53/550 |
| 5,158,505 A * | 10/1992 | Woyach | | 474/95 |
| 5,389,044 A * | 2/1995 | Bandy et al. | | 74/450 |
| 6,074,316 A * | 6/2000 | Murrietta, Sr. | | 74/450 |
| 6,413,006 B1 * | 7/2002 | Neugart | | 403/344 |
| 6,840,701 B2 * | 1/2005 | DaCunha et al. | | 403/344 |
| 6,964,313 B2 * | 11/2005 | Phillips et al. | | 180/220 |

* cited by examiner

*Primary Examiner* — Daniel Stodola
(74) *Attorney, Agent, or Firm* — Ellis B. Ramirez; Prass LLP

(57) ABSTRACT

Shaft-coupling assemblies using the same shaft but different removable coupling devices (pulleys or gears, etc). The coupling devices are located at any location on the shaft and can be the same or different sizes.

7 Claims, 6 Drawing Sheets

COUPLING AND SHAFT ASSEMBLY

The presently disclosed embodiments are directed generally to motor-motor shaft configurations and, more specifically, to motor shaft and coupling assemblies.

BACKGROUND

Various motor shaft assemblies have different uses which require a plurality of different pulleys or couplings resulting in a required, substantially large inventory of motors and motor shafts with fixed pulleys or couplings. When ordered and when inventoried, each of these different motors and motor shafts with fixed couplings have different specific uses, requiring different part numbers, higher costs associated with keeping each specific configuration and replacement parts, higher stocking space requirements and, generally, other costs and inconvenience associated with a plurality of inventoried items. Often motors and media drive shaft assemblies have different part numbers because they have unique pulleys or couplings, or axial locations for those components on the motor or motor shaft.

SUMMARY

The present disclosed embodiments provide a shaft-coupling assembly devoid or substantially devoid of the above noted disadvantages. The embodiments described herein would enable mounting almost any different kind or size coupling on a universal motor drive shaft over different axial locations on the shaft by using unique pulleys or couplings designed to mount on this common universal shaft.

This assembly comprises a universal motor shaft with at least one coupling unit operatively connected thereto. This coupling unit has means to be removably secured to said shaft and is adapted to be removed and replaced with a second coupling unit. The shaft has means to receive different sizes of coupling units at the same or at different axial locations on a longitudinal portion of said shaft. By "axial location" is meant throughout this disclosure and claims as the point on the shaft where the coupling unit is fixed, i.e., 2, 4, 6, etc. inches from the point where the shaft contacts the motor.

For clarity and ease of understanding in this disclosure, a coupling unit is selected from the group consisting of pulleys, gears, cams, actuators and mixtures thereof. Sometimes a pulley and a separate gear, for example, can be mounted at the same time on the shaft. A coupling is generally defined as a device for joining two rotating shafts semi permanently at their ends so as to transmit torque from one to the other.

The coupling unit of this disclosure comprises a hub and a coupling means, all as an integral single unitary part or "hub-coupling" unit, as will be noted throughout this disclosure. The universal motor shaft of the described embodiments has a terminal portion comprising a D-flat section. An adjustable clamp having a flat interior section that abuts against this D-flat section is used to fix the hub-coupling unit in place on the shaft. This hub-coupling unit can be located and fixed on any longitudinal portion of the shaft ("axial location") depending upon the hub length on the molded coupling or pulley. Different size coupling means can be used as well as different locations on the shaft.

The embodiments defined herein comprise, as earlier noted, a universal motor shaft with at least one hub-coupling unit. This unit comprises a hub with a coupling means operatively connected thereto, said hub-coupling unit having means to be removably secured to said shaft. Also the hub-coupling unit is adapted to be removed and replaced with at least a second hub-coupling unit. The shaft obviously therefore has means to receive different sizes of the coupling units at the same or at different axial locations on the longitudinal portion of said shaft. The hub-coupling unit has securing means for being securely fixed in place on said shaft. This securing means comprises a clamp having pins or protrusions extending therefrom which fit into apertures in the hub of the hub-coupling unit.

As shown in the drawings, the universal shaft and coupling assembly are operatively connected to a motor. This shaft is an elongated rod or shaft with a D-flat at its terminal end or both terminal ends. The shaft has means to receive at least one different size coupling at the same or different axial locations along longitudinal points of said shaft. The coupling unit comprises a unitary structure unit including a coupling device and a hub. More than one coupling device may be incorporated into one hub, if desirable. This hub-coupling unit is adapted to be installed on or removed from operative contact with the shaft. This hub-coupling unit has locking tapered apertures which have means to be mated with and lock with tapered pins in a universal mounting clamp. The mounting clamp is in locking contact with the D-flat of said shaft and also in contact with said hub-coupling unit. The shaft has a rounded configuration throughout its longitudinal portion except for said D-flat on its outer terminal section to provide or accommodate operative engagement with the locking clamp.

The positioning of the coupling is determined by maintaining the hub the same length, i.e., in one embodiment the full length of the shaft and the coupling located on any point on the hub. There is a constant distance L from the motor to the end of the hub.

The following terms have the below designated meaning in this disclosure: "Radial distance"—the distance from the center of hub-coupling unit extending to the outer peripheral edge of the coupling means; "Longitudinal portion" or axial portion of shaft—the axial location starting with the motor-shaft connection or shoulder or the distance from the motor shaft connection or shoulder to the closest face of the coupling means. "Actuator"—a device which can mount to the motor shaft as a coupling unit but performs a different function such as a mechanical finger(s), cam(s) or gate(s). These devices may be used to position or apply a linear force to a mechanical component rather than couple shafts to transmit torque.

DETAILED DISCUSSION OF DRAWINGS AND PREFERRED EMBODIMENTS

Figure 1:
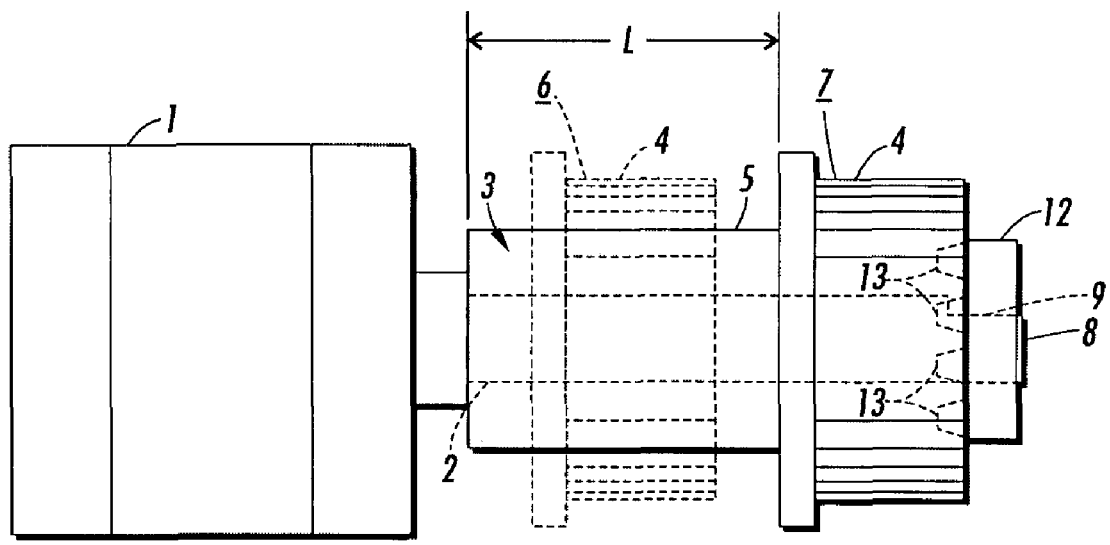
FIG. 1 illustrates a side view embodiment where the same size coupling means at two different locations on the shaft are shown.

In FIG. 1 a motor 1 is shown having operatively attached to it a motor shaft 2. On shaft 2 is a hub-coupling unit 3 molded as one piece where the coupling unit 4 (pulley) and the hub 5 are integral with each other. Obviously, any other suitable hub-coupling unit 3 can be used. The drawing shows the hub 5 having a length "L" in one embodiment at one location 6 on shaft 2. In this embodiment, the hub-coupling unit 3 is shown in dotted lines on the center of hub 5. In a second location 7, the hub-coupling unit 3 is shown at the end of hub 5 closer to the shaft end 8 and D-flat 9. This second location 7 is shown in solid lines. Not only can the coupling unit 4 be located on several locations on shaft 2, but different size coupling (pulley) can be used; i.e., one size coupling unit 4 is removed (as hub-coupling unit 3) from the shaft, and a second different size coupling unit 4 is slid onto the shaft 2. Thus, different locations of coupling unit 4 on shaft 2 is provided herein as is the accommodations to use different size coupling unit 4 and/or different size hub-coupling unit 3. The shaft 2 is enabled to receive different sizes of coupling units 3 at the same or at different axial locations on a longitudinal portion of the shafts 2. The coupling unit 4 is an integral portion of the hub coupling unit 3. At the terminal portion of hub-coupling unit 3 nearest D-flat 9 are positioned locking apertures 11 circularly positioned around circular hub 5 (see FIG. 2). The drawings show four apertures 11; however, any suitable amount of apertures 11 can be used. Clamp 12 has pins or projections 13 that fit into apertures 11 to fix the hub 5 in place. Clamp 12 is tightened by screw 14 which locks clamp 12 to hub 5 where pins 13 are mated into apertures 11. The apertures 11 and pins 13 are tapered to provide a better and more secure fit with minimum rotational clearance. Any suitable pin-aperture arrangement, however, may be used. The shaft end 8 has a D-flat 9 which mates with flat section 15 of clamp 12. This again provides a more secure lock. This flat section 15 is clearly shown in FIG. 2, which is an end view of the clamp 12—D-flat 9 attachment.

Figure 2:
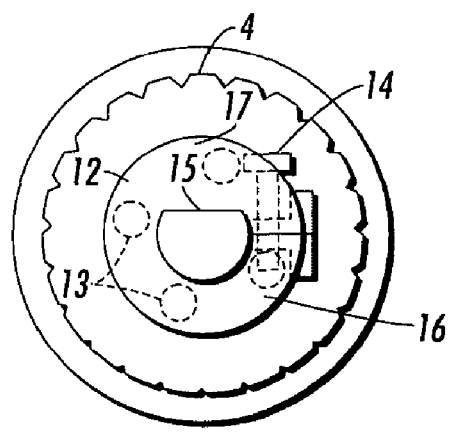
FIG. 2 illustrates an end view of the clamp attached to the hub of the hub-coupling unit.

In FIG. 2 the clamp 12 is shown with pins 13 located around the inner circumference of clamp 12. The flat clamp section 15 fits over D-flat 9 for a secure clamp to hub to shaft lock. A tightening screw 14 is located at the outer circumference of clamp 12 and tightens movable clamp sections or portions 16 and 17 together to lock around shaft 2 and into hub 5. If a hub-coupling means location closer to motor 1 is desired (dotted lines 6 in FIG. 1), the hub 5 is merely made where the coupling means 4 is located on hub 5 closer to motor 1.

Figure 3:
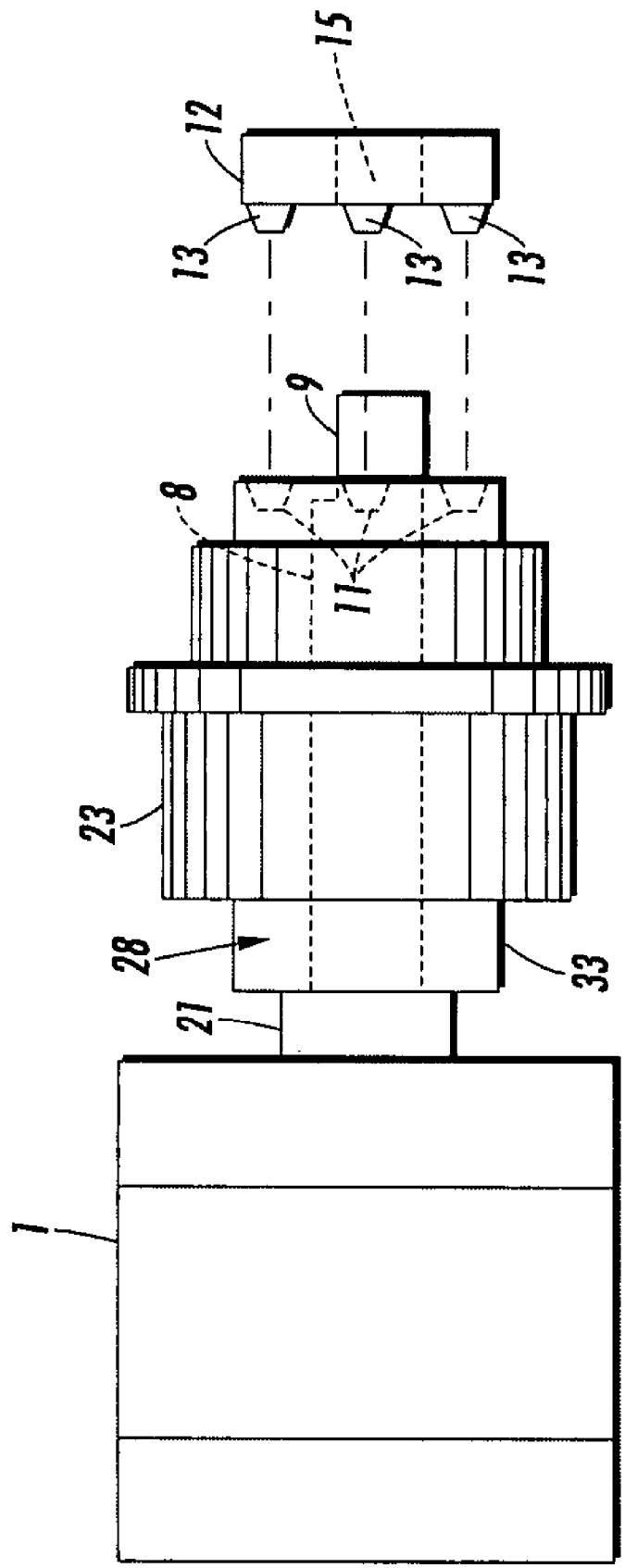
FIG. 3 illustrates a side view of the motor and shaft with the clamp-hub-coupling unit just prior to attachment to the clamp means. Also a configuration with a double pulley (coupling) in a different axial location is shown.

In FIG. 3 the clamp-hub connection arrangement just before connection is shown, where tapered apertures 11 and tapered pins 13 are used. The hub-coupling unit 3 is easily removed from shaft 2 by merely sliding it off shaft 2 and replacing it, for example, with a second, larger or smaller coupling means. This second coupling means is then locked into any position on shaft 2 by using the clamp pins 13 hub aperture 11 connection system. In this embodiment 2 (or more) pulleys or coupling means 23 are used. Circular hub 33 is shown as part of coupling 28.

Figure 4A:
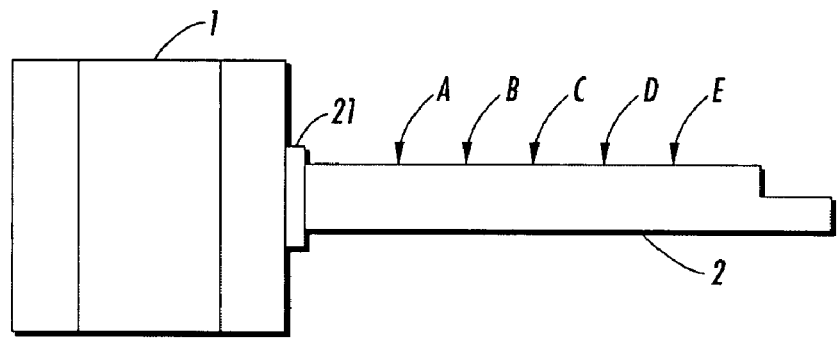
FIG. 4A illustrates an example of the shaft axial locations A-E where the coupling means can be located on hubs having the same length.
Figure 4B:
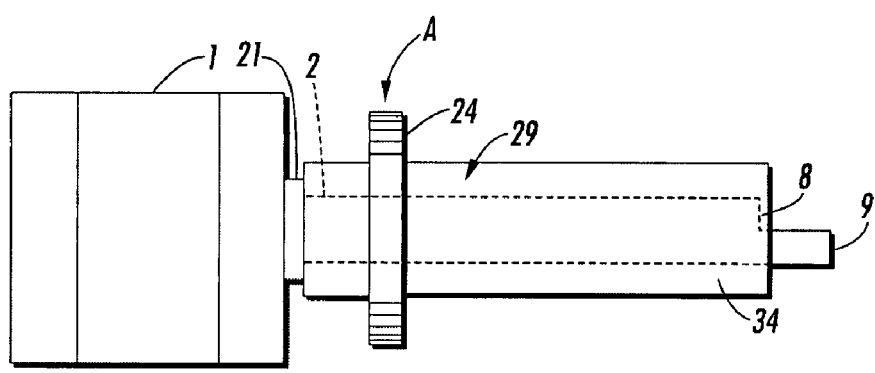
FIG. 4B shows the axial location of the coupling at location A and FIG. 4C shows the axial location of the coupling at location D.
Figure 4C:
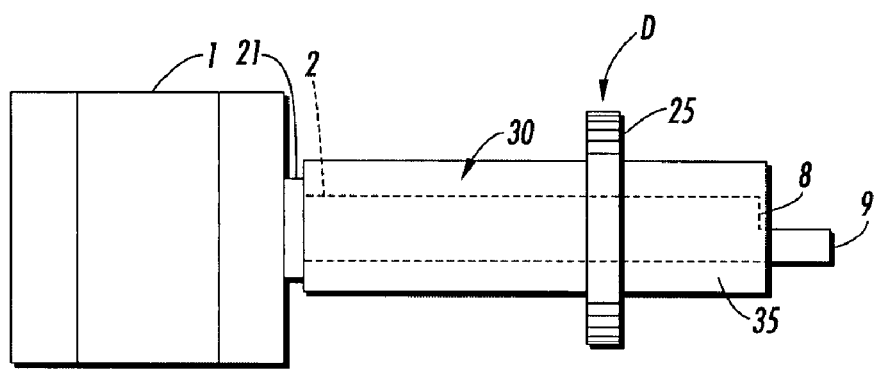

In FIG. 4A various axial positions A-E (any suitable number of positions can be used) are shown where the coupling means 4 can be located. The coupling means (attached to hub 5) can be located anywhere on the shaft 2 as required for a particular use. In FIG. 4B hub coupling unit 29 a coupling means 24 is shown on a hub 34 of the same length at position A and in FIG. 4C at position D. In FIG. 4C, hub coupling unit 30 and coupling means 25 is shown on hub 35. Again, any suitable positions may be used depending upon the length of shaft 2. Also any size coupling means 24 may be used in addition to different locations on shaft 2. Therefore, FIG. 4A shows varying the location of coupling means 24 by using the same length hub 34 but locating coupling means 4 at a different location on hub 5. A shoulder 21 is located adjacent motor 1 and hub 5.

Figure 5:
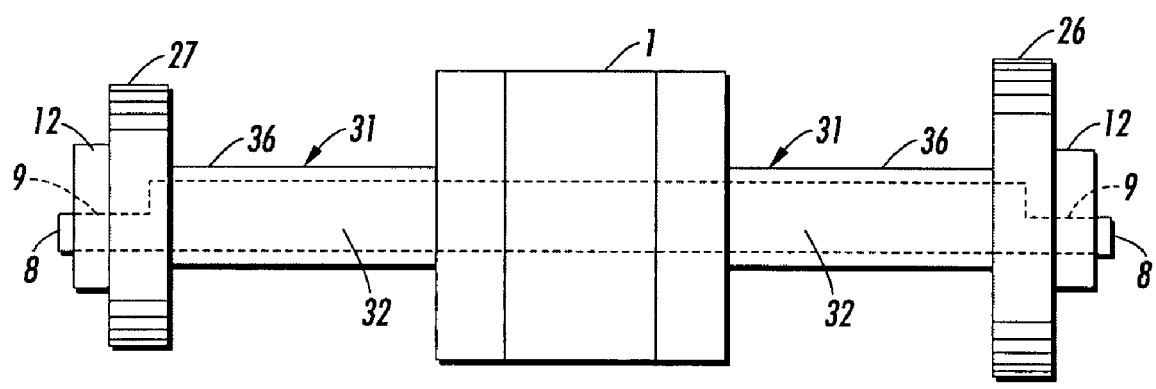
FIG. 5 illustrates an embodiment having a double shaft with two D-flats at their terminal ends and a motor midway on the shaft.

In FIG. 5, an embodiment having a single shaft 2 having D-flats 9 on each end as is shown. The motor 1 may be positioned midway on shaft 32. Each side of the motor 1 has a hub-coupling unit 31 and clamps 12. Hub 36, hub coupling unit 31, and shaft 32 are shown in FIG. 5.

Figure 6:
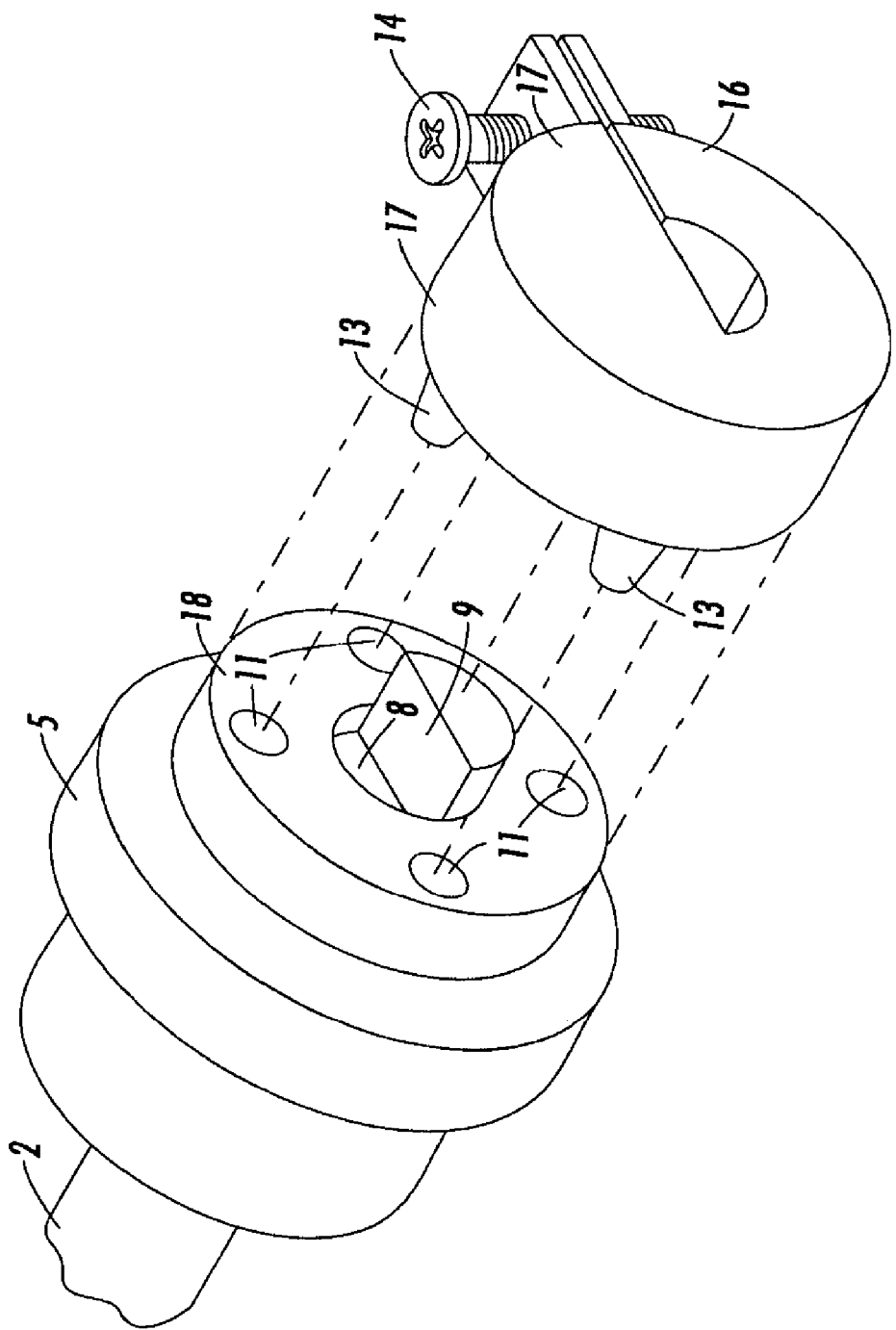
FIG. 6 illustrates the shaft with D-flat and the clamp used to connect to the hub to fix the hub-coupling means in location.

In FIG. 6 the means used to lock hub 5 in place on shaft 2 is shown. The outer face 18 of hub 5 has apertures 11 adapted to receive pins 13 from clamp 12. Once the pins 13 are fixed into apertures 11, and clamp 12 abuts the outer face 18 of hub 5, the movable sections 16 of clamp 12 are tightened together by screw 14, thereby locking hub 5 and hub-coupling unit 3 in place both axially and rotationally. Clamp flat section 15 fits over D-flat 9 ensuring further fixing of clamp 12 to hub 5 and around shaft D-flat 9.

Figure 7:
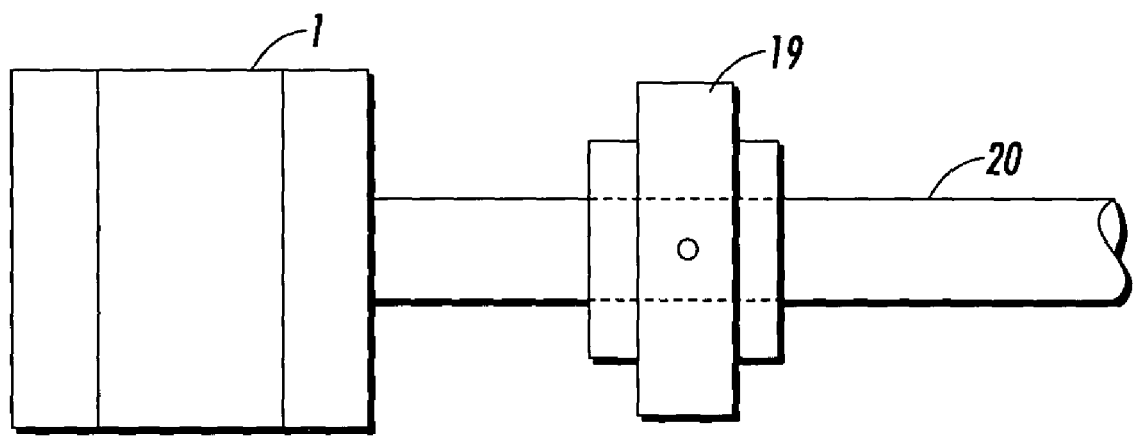
FIG. 7 illustrates a prior art where the hub-coupling unit is irremovably permanently fixed on the shaft.

FIG. 7 shows a prior art coupling means 19 irremovable and fixed in place on shaft 20. Not only is the coupling means here locked permanently in place on shaft 20, but also only one size coupling means 19 can be used.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A universal shaft and coupling assembly for connection to a motor, comprising in an operative arrangement, an elongated shaft with a D-flat, said shaft enabled to receive different size couplings at the same or different axial locations along longitudinal points of said shaft, said couplings each comprising a unitary structure unit including a coupling device and a circular hub forming a hub-coupling unit, said hub-coupling unit being adapted to be installed or removed from operative contact with said shaft, said hub-coupling unit having on an outer terminal portion a component of an adjustable locking structure comprising locking tapered circular apertures which are enabled to be mated and lock with tapered pins in a universal mounting clamp, said mounting clamp enabled to be in locking contact with said D-flat of said shaft and said hub-coupling unit, a terminal portion of the hub-coupling unit nearest the D-flat are positioned said circular locking apertures which are circular positioned around a circular hub, said mounting clamp enabled to prevent both hub-coupling rotation and axial movement of said hub-coupling unit, said shaft having rounded configuration throughout its longitudinal portion except for said D-flat on its outer terminal section.

2. The assembly of claim 1 wherein said coupling device is a pulley.

3. The assembly of claim 2 wherein a tightening screw is located on an outer circumference of said mounting clamp and adapted to tighten said circular hub to said shaft.

4. The assembly of claim 3 wherein said mounting clamp is enabled to be tightened to said circular hub by a screw.

5. The assembly of claim 4 wherein a tightening screw is located an outer circumference of said clamp and adapted to tighten said shaft to said hub.

6. The assembly of claim 1 wherein more that one coupling is used at different axial locations.

7. The assembly of claim 1 wherein more than one coupling is used, each of said couplings having different radial distance.

* * * * *